(No Model.)
W. MEYRICK & L. WILSON.
VENT VALVE.
No. 557,412. Patented Mar. 31, 1896.
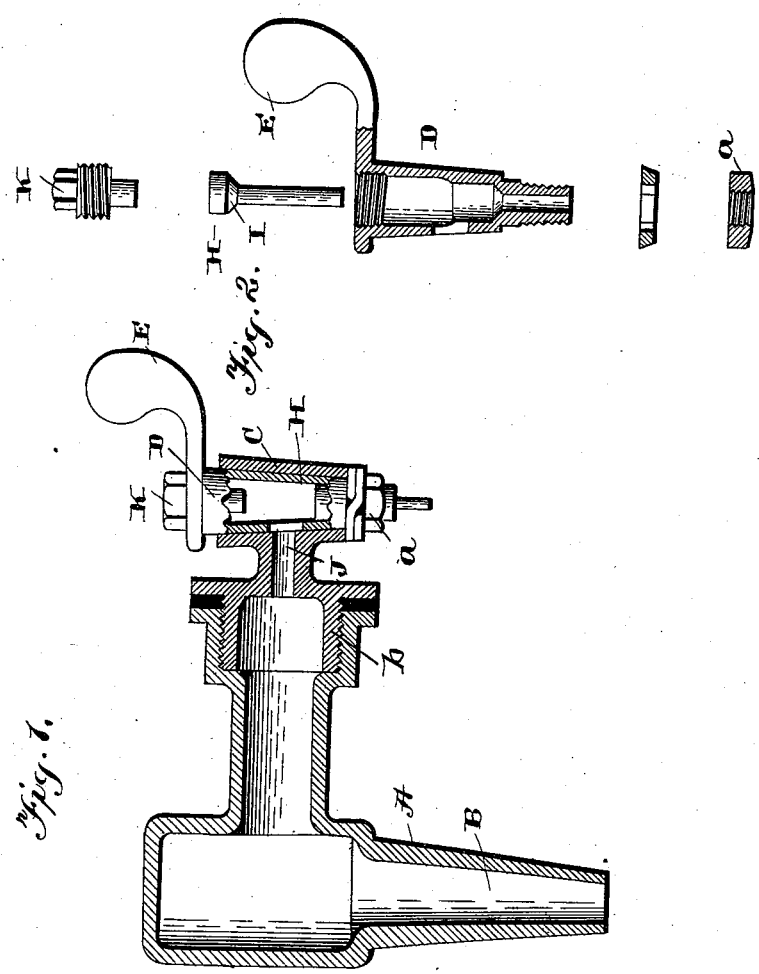

UNITED STATES PATENT OFFICE.

WILLIAM MEYRICK AND LUTHER WILSON, OF LOUISVILLE, KENTUCKY; SAID MEYRICK ASSIGNOR TO SAID WILSON.

VENT-VALVE.

SPECIFICATION forming part of Letters Patent No. 557,412, dated March 31, 1896.

Application filed July 23, 1895. Serial No. 556,926. (No model.)

*To all whom it may concern:*

Be it known that we, WILLIAM MEYRICK and LUTHER WILSON, of Louisville, in the county of Jefferson and State of Kentucky, have invented certain new and useful Improvements in Vent-Valves; and we do hereby declare the following to be a full, clear, and exact description of the invention, such as will enable others skilled in the art to which it pertains to make and use it, reference being had to the accompanying drawings, which form part of this specification.

Our invention relates to improvements in vent-valves; and it consists in the particular construction and arrangement of parts which will be fully described hereinafter and especially pointed out in the claim.

The object of our invention is to provide a vent-valve for vessels of all kinds which is adapted to be cut off entirely, so that there can positively be no escape of air to or without the vessel, and which at the same time is capable of being turned so that there will be an inlet of air when the liquid or contents of the vessel are being withdrawn.

Our invention further consists in providing a rotating valve carrying a reciprocating valve therein, the said reciprocating valve consisting of aluminium, whereby it is very light to be effected and operated by a very slight pressure.

Figure 1 is a vertical sectional view of our vent-valve. Fig. 2 is a detached view of the rotating valve or stop-cock.

Reference being had to the accompanying drawings, A indicates, preferably, an L-shaped stem having its end B adapted to be placed within an opening, preferably in the top of the vessel or cask to which it is to be applied. The opposite end of the L-shaped stem A is provided with a socket C having an enlarged screw-threaded end b, provided with an inlet J within the stem portion A. Within this socket C is a rotating hollow valve D having at one side intermediate its ends an opening adapted to register with the opening J when it is turned, and its upper end having a handle E, preferably integral therewith. The lower end of this hollow valve D is preferably screw-threaded and provided with a nut a for holding it in place within the socket C, as clearly shown. The upper end of this hollow rotating valve or stop-cock is closed by means of a nut or button K, and placed within the hollow rotating valve or cock D is the longitudinally-reciprocating valve H, preferably made of aluminium, whereby it is very light and capable of being actuated by a very slight pressure. This reciprocating valve H has a seat I resting upon a corresponding seat formed in the rotating valve or cock D, and the lower portion of the valve extends through the reduced opening or hollow portion of the valve and projects to be operated by the fingers, if necessary, to remove it from its seat should it stick or for any other reason fail to operate. The reciprocating valve H is limited in its upward movement by the nut or button K, as will be readily understood.

By means of this construction when the liquid is not being withdrawn from the cask or for any other reason it is desired to close the vent opening thoroughly and firmly, so that there can neither be ingress nor egress of air from the cask or vessel, it is only necessary to rotate the cock or valve D around and carry the opening J out of line with the opening in the stem, when there can be no escape of air in either direction, as will be clearly understood.

When it is desired to have the vent operate, it is only necessary to turn the rotating valve D in the position shown in Fig. 1, when the light aluminium reciprocating valve H will move from its seat should liquid or contents of the barrel be removed, as will be understood.

Also by this construction the vent-opening can be closed by the rotating cock or valve D and the button or nut K removed, thus permitting the removal of the reciprocating valve H for the purpose of regrinding the seat or for the purpose of cleaning it, both of which under some conditions may be very advantageous.

From the above description it will be seen that we have produced a very simple and cheap vent-valve, having advantages not possessed by the ordinary vent now in use.

Having thus fully described our invention, what we claim, and desire to secure by Letters Patent, is—

The combination of a stem having a transverse open-ended socket, a hollow rotatable open-ended valve having the interior of its lower end reduced to form a valve-seat, a reciprocating valve having an enlarged upper end adapted to pass through the large upper end of said rotatable valve and to seat upon the reduced lower end, and a removable plug for the said upper end of the rotatable valve, substantially as described.

In testimony whereof we affix our signatures in presence of two witnesses.

WILLIAM MEYRICK.
LUTHER WILSON.

Witnesses:
JOS. H. TOBE,
WM. HAUNGS.